United States Patent [19]

Murakami et al.

[11] Patent Number: 5,776,570

[45] Date of Patent: *Jul. 7, 1998

[54] FUEL HOSE AND METHOD OF PRODUCING THEREOF

[75] Inventors: Koyo Murakami, Nagoya; Hiroaki Ito; Tetsuji Narasaki, both of Komaki, all of Japan

[73] Assignee: Tokai Rubber Industries Ltd., Aichi, Japan

[*] Notice: The term of this patent shall not extend beyond the expiration date of Pat. No. 5,622,757.

[21] Appl. No.: 603,317

[22] Filed: Feb. 20, 1996

[30] Foreign Application Priority Data

Feb. 21, 1995 [JP] Japan .................................. 7-032657

[51] Int. Cl.⁶ .............................. B05D 7/22; B29D 23/00
[52] U.S. Cl. .............. 428/36.8; 428/36.91; 428/475.8; 428/492; 138/137; 138/141; 427/230; 427/233; 427/476; 427/375
[58] Field of Search ................. 428/36.8, 36.9, 428/36.91, 35.7, 475.8, 492, 495; 427/476, 470, 230, 236, 233, 375; 138/137, 141, 146

[56] References Cited

U.S. PATENT DOCUMENTS

| | | | |
|---|---|---|---|
| 4,438,230 | 3/1984 | Schwarz | 524/151 |
| 4,907,625 | 3/1990 | Ito et al. | 138/126 |
| 5,068,137 | 11/1991 | Ozawa et al. | 428/36.2 |
| 5,151,142 | 9/1992 | Imai et al. | 152/565 |
| 5,157,083 | 10/1992 | Aonuma et al. | 525/285 |
| 5,472,746 | 12/1995 | Miyajima et al. | 138/137 |

*Primary Examiner*—Rena Dye
*Attorney, Agent, or Firm*—Armstrong, Westerman, Hattori, McLeland & Naughton

[57] ABSTRACT

A fuel hose comprising an outer rubber layer wherein polysulfide is crosslinked so that polysulfide bonding density is not less than $4 \times 10^{-5}$ mol/cm$^3$ and acrylonitrile-butadiene rubber having a carboxyl group is contained, and an inner polyamide resin layer which is laminated on the inside face of the outer rubber layer and bonded thereon by heat treatment. Since the polyamide resin powder is melted by the heat treatment and the polysulfide bonding decomposes so that the resultant residue after decomposition combines with polyamide molecules, resulting in a direct and strong bonding of the outer rubber layer and the inner polyamide resin layer. Moreover, since the special acrylonitrile-butadiene rubber is mixed therein, it is possible to set up the heat treatment condition at a rather mild one.

4 Claims, 1 Drawing Sheet

FIG.1
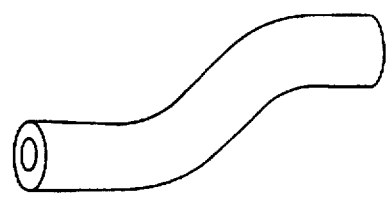
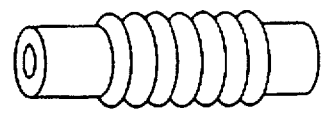
FIG.2

FUEL HOSE AND METHOD OF PRODUCING THEREOF

TECHNICAL FIELD

This invention relates to a fuel hose which is used in the fuel piping systems of automobiles and the like and a method of producing thereof.

BACKGROUND OF THE INVENTION

Heretofore, as a fuel hose which is used in the fuel piping systems of automobiles and the like, a single-layer rubber hose comprising NBR·PVC rubber (a mixture of acrylonitrile-butadiene rubber and polyvinylchloride) superior in gasoline resistance and impermeability to gasoline has been well known. However, it is a current situation that such a single-layer hose cannot meet the recent severe regulations on impermeability to gasoline. In such a situation, to satisfy severer conditions, a hose comprising the above outer rubber layer and an inner fluoro rubber layer which is formed on the inside face of the outer rubber layer was developed and has been employed in some fields.

However, since the hose having the inner fluoro rubber layer has a defect of a high cost in spite of its excellent performance, such a hose has not been generally employed. In the meantime, it is proposed that the inner layer be formed by replacing the fluoro rubber with polyamide resin which is more inexpensive.

The polyamide resin has superior properties in gasoline resistance and impermeability to gasoline. However, since it shows a bad adhesive property with an outer rubber layer, it is required to apply adhesive on the inside face of the outer rubber layer to laminate these two layers. There causes a problem especially in a filler hose which functions to connect a hose end with the other material. Namely, the filler hose is often formed into a smooth faced and curved shape shown in FIG. 1 or into an accordion shape shown in FIG. 2 for wide adoptability. In case that a hose is formed into such a special shape, it is difficult to apply adhesive evenly on the inside face thereof and also a dry process after the application of the adhesive is required, resulting in a more complicated process. Further, there is the anxiety that adhesive solvent may aggravate environment. Therefore, it is strongly demanded to establish a method of producing an inexpensive fuel hose easily by laminating the inner polyamide resin layer on the inside face of the outer rubber layer without applying adhesive therebetween.

SUMMARY OF THE INVENTION

Under these circumstances, it is an object of this invention to provide a fuel hose comprising an outer rubber layer and an inner polyamide resin layer laminated on the inside face of the outer rubber layer without applying adhesive therebetween and a method of producing thereof.

To accomplish the above object, a first gist of the invention relates to a fuel hose comprising an outer rubber layer wherein polysulfide is crosslinked so that polysulfide bonding density is not less than $4 \times 10^{-5}$ mol/cm$^3$ and acrylonitrile-butadiene rubber having a carboxyl group is contained, and an inner polyamide resin layer which is laminated on the inside face of the outer rubber layer and bonded thereon by heat treatment. A second gist of the invention relates to a method of producing a fuel hose which comprises:

a step of preparing an outer rubber layer wherein polysulfide is crosslinked so that polysulfide bonding density is not less than $4 \times 10^{-5}$ mol/cm$^3$ and acrylonitrile-butadiene rubber having a carboxyl group is contained, a step of laminating polyamide resin powder on the inside face of the outer rubber layer, a step of forming an inner polyamide resin layer by heat treatment on the laminate of the outer rubber layer and the inner polyamide layer, and at the same time bonding the laminate.

Namely, inventors of the present invention have conducted a series of studies on various rubber materials to be employed for the outer rubber layer in order to find out such an optimum material that shows preferable properties in being banded with polyamide resin without adhesive. As a result, they found out that when the outer rubber layer is formed by the rubber wherein the crosslinking density of polysulfide bonding (—Sx—, x≧3) is not less than $4 \times 10^{-5}$ mol/cm$^3$, and polyamide resin powder is laminated thereon and heat treated, the polyamide resin powder is melted so as to be formed into an inner layer by the heat treatment and the polysulfide bonding decomposes so that the resultant residue after decomposition combines with polyamide molecules, resulting in a direct and strong bonding of the outer rubber layer and the inner polyamide resin layer. However, since there is a possibility that the outer rubber layer may thermally cure according to heat treatment conditions so that elasticity or flexibility of thus obtained fuel hose may be deteriorated, further studies have been conducted on a method by which adhesive strength between the outer rubber layer and the inner polyamide resin layer can be sufficiently retained even in a relaxed heat treatment condition. As a result, they reached the present invention by their finding that the above problem can be solved if acrylonitrile-butadiene rubber (just abbreviated to "NBR" hereinafter) having a carboxyl group is contained into the rubber in which the polysulfide bonding is adjusted so that crosslinking density is not less than $4 \times 10^{-5}$ mol/cm$^3$. In addition, if rubber is vulcanized by a sulfur based vulcanization accelerator, the bridge structure may form monosulfide bonding (—S—), disulfide bonding (—S$_2$—) and polysulfide bonding (as shown hereinbefore). It is general that polysulfide bonding density is adjusted at a minimum level to the utmost from a viewpoint of heat resistance as rubber products for automobiles. On the other hand, the polysulfide bonding density is adjusted at such a high level as generally unbelievable in the present invention, as mentioned above, from a viewpoint of adhesive property with the inner polyamide resin layer, the heat resistance of rubber can be retained by decomposing the polysulfide bonding with heat in the heat treatment.

Further, it is preferable to employ a thiazole based vulcanization accelerator as a vulcanization accelerator to be mixed in rubber compound for forming the outer rubber layer to increase the polysulfide bonding density as mentioned above.

Furthermore, the polysulfide bonding density in the vulcanization rubber can be measured by a chemical reagent treatment method in accordance with "Determination of Crosslink Density and Vulcanizate Structure" (Monsanto, Rubber Chemicals, July 1983) and a swelling pressure method in accordance with "Test Method Development for Bridge Structure Analysis by a Swelling Pressure Method, No.1 report" (Bridgestone Corporation, Japanese Rubber Association Organ Vol. 60, No. 5, 1987).

Now, the present invention is described in detail.

The fuel hose of the present invention comprising the outer rubber layer and the inner polyamide resin layer which is integrated into the outer rubber layer without adhesive can be, for example, produced as follows. First of all, a rubber material, NBR having a carboxyl group, a vulcanization accelerator, a plasticizer and the like are mixed and adjusted for the outer rubber layer, and then such a mixture is put into an injection molding machine or is vulcanized after extrusion molding or the like so as to form the outer rubber layer. Secondly, polyamide resin powder is laminated on the inside face of the outer rubber layer and subsequently heat treated so that the polyamide resin powder is melted and integrated with the outer rubber layer. Thus, the fuel hose as an object can be obtained.

In the above method, NBR·PVC rubber is optimum as a rubber material for forming the outer rubber layer from a viewpoint of gasoline resistance and impermeability to gasoline. However, this is not critical and any other rubber material may be employed only if it can be vulcanized with sulfur. For example, there are acrylonitrile-butadiene rubber (NBR), polychloroprene rubber (CR), ethylene-propylene copolymer rubber (EPDM) and the like.

Further, as a vulcanization accelerator, any conventional type which has been well known heretofore may be employed, however, it is required that the crosslinking density of the polysulfide bonding caused by vulcanization be increased to not less than $4 \times 10^{-5}$ mol/cm$^3$. For this reason, it is preferable that a thiazole based vulcanization accelerator as shown in the following general formula (1). Especially, dibenzothiazyl disulfide as shown in the following general formula (2) is most preferable. Furthermore, on condition that the thiazol based vulcanization accelerator is mainly mixed, the addition of the other vulcanization accelerator(s) than the thiazol based vulcanization accelerator results in the same effect.

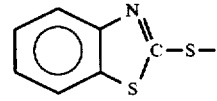

(1)

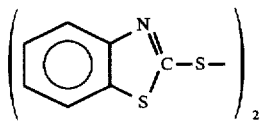

(2)

Furthermore, as a vulcanizing agent, a plasticizer or the like, which is combined with the rubber material and the vulcanization accelerator, those which have been heretofore employed for forming an outer rubber layer may be appropriately adopted.

Still further, a great characteristic of the present invention is to mix NBR having a carboxyl group into the rubber composition for forming the outer rubber layer. Namely, the effect of the sufficient adhesive strength between the outer rubber layer and the inner polyamide resin layer can be obtained by mixing the specific NBR therein even though the heat condition for melting the outer rubber layer and the inner polyamide resin powder is set up at a rather mild condition.

The NBR having a carboxyl group may be obtained by polymerizing acrylonitrile monomer, butadiene monomer and monomer having carboxyl group (just abbreviated to "carboxyl group monomer" hereinafter) as a ternary component.

As the carboxyl group monomer, there are acrylic acid, methacrylic acid and the like, which may be employed solely or in combination of two or more. It is preferable to set up its mixing ratio at 1 to 15% by weight. In case of less than 1%, the effect of improving the above adhesive strength is poor, while in case of over 15%, there is a tendency that a sealing property decreases due to deterioration of permanent set in fatigue of rubber in spite of sufficient improvement in adhesive strength. In addition, the mixing ratio of the NBR having carboxyl group is preferably set up at 2 to 15 parts by weight (just abbreviated to "parts" hereinafter) based on 100 parts of rubber material such as NBR·PBC rubber and the like. In case of less than 2 parts, the effect of improving the adhesive strength is poor, while in case of over 15 parts, there is a tendency that a sealing property decreases due to deterioration of permanent set in fatigue of rubber in spite of sufficient improvement in adhesive strength.

In the meantime, as polyamide resin for forming the inner layer, there are nylon 6, nylon 11, nylon 12, nylon 6·10, nylon 6·12, nylon 6/66 copolymer, nylon 6/12 copolymer and the like. It is not specifically limited, however, nylon 11 is most preferable because it is superior both in gasoline permeability and flexibility. Further, it is possible to employ a mixture of the polyamide resin and a plasticizer or elastomer, or a copolymer of the polyamide resin and polyether or polyester.

Besides, it is preferable to set up a molding temperature at 160° C. and a molding time for 5 to 10 minutes as conditions for molding an outer tubular rubber layer, which depends on a tube shape, thickness and the like, when employing an injection molding machine.

Furthermore, as a method for laminating polyamide resin powder on the inside face of the molded outer rubber layer, it is preferable to attach polyamide resin powder thereon by electrostatic attraction caused when the polyamide resin powder is positively or negatively charged. In addition, a various painting methods such as a powder fluid coating method, a spray coating, an internal dip coating method, an electro deposition and the like.

Still furthermore, as a heat treatment for melting the polyamide resin powder so as to be integrated with the outer rubber layer, any heating means is acceptable. For example, an oven can be employed. It is preferable to set up a heating temperature at 200° to 220° C. and a heating time for 10 to 30 minutes, which are rather mild conditions. This is because the hardness of thus obtained rubber outer layer increases so as to worsen elasticity and flexibility thereof under severer conditions. Additionally, when the NBR having a carboxyl group is not mixed, adhesive strength between the outer rubber layer and the inner polyamide resin layer tends to weaken under such mild heat treatment conditions. On the other hand, sufficient adhesive strength therebetween can be obtained due to the addition of the NBR having a carboxyl group in the present invention.

Besides, thus obtained fuel hose may be in any shape. According to the present invention, it is not necessary to apply adhesive on the inside face of the outer rubber layer so as to be bonded with the polyamide inner layer. Therefore, it is especially convenient for figures such as a curved shape shown in FIG. 1 or an accordion shape shown in FIG. 2. It is most preferable that the present invention applies to filler hoses which are formed into such complicated figures.

In thus obtained fuel hose, the polyamide resin powder is melted by heat treatment after being laminated and strongly adhered on the inside face of the outer rubber layer. Heretofore, there has been a problem of delamination caused by uneven coating of adhesive when laminating an outer layer and an inner layer with an adhesive. However, according to the present invention, there is no delamination caused, resulting in excellent quality. The polysulfide bonding formed in high density on the outer rubber layer decomposes by the heat treatment and the resultant residue after decomposition combines with molten polyamide resin so that the polysulfide bonding density decreases, which results in sufficient heat resistance of the outer rubber layer. Moreover, since it is possible to set up mild heat treatment conditions for melting the polyamide resin powder, the outer rubber layer may not thermally cured so that a hose superior in elasticity and flexibility can be obtained.

EFFECTS OF THE INVENTION

As mentioned before, the fuel hose of the present invention is the laminate of the outer rubber layer and the inner polyamide resin layer and is more inexpensive than a conventional type having an inner fluoro rubber layer. Further, since the outer rubber layer and the inner polyamide resin layer are laminated directly without adhesive, delamination may not be caused, resulting in superior quality. Moreover, since the heat treatment can be set up at mild conditions, elasticity or flexibility of the hose may be retained without heat curing of the outer rubber layer. In addition, according to the present invention, there becomes no necessity of adhesive, required for bonding the outer layer and the inner layer heretofore, so that a process for coating adhesive and a dry process after the application of the adhesive are unnecessary, resulting in an easier and more hygienical manufacturing process of the above fuel hose. Furthermore, since it is possible to set up the heat treatment for melting the polyamide resin powder at mild conditions, reduction of energy consumption can be realized by shortening the heat treatment time and controlling the heat treatment temperature. Still furthermore, the production efficiency can be improved by shortening the heat treatment time. Still even furthermore, according to the present invention, filler hoses and the like which are formed into complicated figures can be produced easily. Additionally, the above effects can be conspicuously obtained if a thiazole based vulcanization accelerator is employed as a vulcanization accelerator for forming the outer rubber layer.

BRIEF DESCRIPTION OF THE DRAWINGS

FIG. 1 illustrates one embodiment of a fuel hose according to the present invention and FIG. 2 illustrates another embodiment of a fuel hose according to the present invention.

The present invention will now further be described by reference to the following illustrative examples.

EXAMPLES 1 TO 7 AND COMPARATIVE EXAMPLES 1 TO 2

First of all, each rubber composition was prepared in accordance with the following tables 1 and 2. Then, each composition was injection molded at 160° C. for 5 minutes so as to be formed into accordion fuel hoses (A to G) at 35 mm of inside diameter, in 4 mm thickness and 200 mm length. Each crosslinking density of polysulfide bonding of thus obtained hoses was measured in accordance with the above measuring method. The results are shown in the following tables 3 to 5.

TABLE 1

| | (Parts) | | | |
|---|---|---|---|---|
| | A | B | C | D |
| NBR.PVC *1 | 100 | 100 | 100 | 100 |
| Stearic acid | 0.7 | 0.7 | 0.7 | 0.7 |
| Zinc oxide | 3 | 3 | 3 | 3 |
| Carbon black *2 | 75 | 75 | 75 | 75 |
| Calcium carbonate | 20 | 20 | 20 | 20 |
| Ether ester plasticizer | 30 | 30 | 30 | 30 |
| N-phenyl-N' isopropyl-p-phenylenediamine | 2 | 2 | 2 | 2 |
| NBR having a carboxy group | | | | |
| A *3 | 5 | 10 | 15 | — |
| B *4 | — | — | — | 10 |
| Sulfur | 1.5 | 1.5 | 1.5 | 1.5 |
| Vulcanization accelerator | | | | |
| Thiazole base | | | | |
| MBTS *5 | 0.75 | 0.75 | 0.75 | 0.75 |
| CBS *6 | — | — | — | — |
| Thiuram base | | | | |
| TETD *7 | — | — | — | — |
| TMTD *8 | — | — | — | — |

*1 NBR/PVC = 70/30 (ratio by weight)
*2 Carbon black SRF (a product of Tokai Carbon Co., Ltd.)
*3 Amount of acrylic monomer: 7% by weight
*4 Amount of acrylic monomer: 12% by weight
*5 Dibenzothiazyl disulfide
*6 N-cyclohexyl-2-benzothiazylsulfenamide
*7 Tetraethylthiuramdisulfide
*8 Tetramethylthiuramdisulfide

TABLE 2

| | (Parts) | | |
|---|---|---|---|
| | E | F | G |
| NBR.PVC *1 | 100 | 100 | 100 |
| Stearic acid | 0.7 | 0.7 | 0.7 |
| Zinc oxide | 3 | 3 | 3 |
| Carbon black *2 | 75 | 75 | 75 |
| Calcium carbonate | 20 | 20 | 20 |
| Ether ester plasticizer | 30 | 30 | 30 |
| N-phenyl-N' isopropyl-p-phenylenediamine | 2 | 2 | 2 |
| NBR having a carboxyl group | | | |
| A *3 | 10 | — | 10 |
| B *4 | — | — | — |
| Sulfur | 0.5 | 1.5 | 0.5 |
| Vulcanization accelerator | | | |
| Thiazole base | | | |
| MBTS *5 | — | 0.75 | — |
| CBS *6 | 1.2 | — | — |
| Thiuram base | | | |
| TETD *7 | 2.1 | — | — |
| TMTD *8 | — | — | 2.0 |

*1 NBR/PVC = 70/30 (ratio by weight)
*2 Carbon black SRF (a product of Tokai Carbon Co., Ltd.)
*3 Amount of acrylic monomer: 7% by weight
*4 Amount of acrylic monomer: 12% by weight
*5 Dibenzothiazyl disulfide
*6 N-cyclohexyl-2-benzothiazylsulfenamide
*7 Tetraethylthiuramdisulfide
*8 Tetramethylthiuramdisulfide Then, polyamide resin powder was electrostatically coated in 0.2 mm thick on each inside face of the above 7 kinds of the rubber hoses (A to G) as an outer rubber layer in accordance with the conditions shown in the following tables 3 to 5. Such electrostatic coating was conducted by positively charging the polyamide resin powder by corona discharge at 60 kV/10 μA. Thus obtained laminates were heat treated in accordance with conditions also shown in the following tables 3 to 5, so that fuel hoses as objects were obtained. The smooth faced parts of thus obtained fuel hoses were cut out axially with 25 mm width in a ring state and were cut open axially, and then each circumferential breakaway strength was measured. Further, rubber hardness of each outer rubber layer after the heat treatment was measured in accordance with JIS A and its change was sought. In addition, compression set, flexibility and gasoline permeability of each fuel hose were valued in accordance with the following methods. These results are shown also in the following table 3 to 5.

[Compression set]

Compression set (%) of each sample was measured after 100° C.×22 hours in accordance with JIS K6301.

[Flexibility of hoses]

When one end of a hose was fixed while the other end was strained by 200 mm in the direction of 90° to the axis, the load (N) was measured. In case that the load was not more than 700N, the evaluation was ⊙. In case that the load was from 700 to 900N, the evaluation was ◎.

[Impermeability to gasoline]

Fuel C was sealed in a hose as a pretreatment and was let it stand for 40° C.×168 hours. Subsequently, Fuel C was sealed again and was let it stand with 40° C. maintained.

Weight decrease was measured every 24 hours, up to 72 hours. In case that the weight decrease was 0.1 g for 1 piece per day, the evaluation was ⊙. In case that the weight decrease was 0.1 g to 0.2 g for 1 piece per day, the evaluation was ◯.

TABLE 3

| | EXAMPLES | | | |
|---|---|---|---|---|
| | 1 | 2 | 3 | 4 |
| Outer rubber layer | A | B | C | D |
| Polysulfide bonding density (mol/cm$^3$) | $8 \times 10^{-5}$ | $8 \times 10^{-5}$ | $8 \times 10^{-5}$ | $8 \times 10^{-5}$ |
| Material of an inner polyamide resin layer | nylon 11 | nylon 11 | nylon 11 | nylon 11 |
| Heat treatment conditions: 210° C. × 20 minutes | | | | |
| Change of rubber hardness (JIS A) | +3 | +3 | +4 | +3 |
| Delamination strength of an outer layer and an inner layer (N/mm) | rubber break | rubber break | rubber break | rubber break |
| Compression set (%): 100° C. × 22 hours | 43 | 44 | 50 | 43 |
| Hose flexibility | ◎ | ◎ | ◎ | ◎ |
| Impermeability to gasoline | ⊙ | ⊙ | ⊙ | ⊙ |

TABLE 4

| | EXAMPLES | | |
|---|---|---|---|
| | 5 | 6 | 7 |
| Outer rubber layer | E | A | A |
| Polysulfide bonding density (mol/cm$^3$) | $4 \times 10^{-5}$ | $8 \times 10^{-5}$ | $8 \times 10^{-5}$ |
| Material of an inner polyamide resin layer | nylon 11 | nylon 6/66 copolymer | nylon 12 |

TABLE 4-continued

| | EXAMPLES | | |
|---|---|---|---|
| | 5 | 6 | 7 |
| Heat treatment conditions: 210° C. × 20 minutes | | | |
| Change of rubber hardness (JIS A) | +2 | rubber break | rubber break |
| Delamination strength of an outer layer and an inner layer (N/mm) | 1.7 | rubber break | rubber break |
| Compression set (%): 100° C. × 22 hours | 41 | 43 | 43 |
| Hose flexibility | ◎ | ◎ | ◎ |
| Impermeability to gasoline | ⊙ | ⊙ | ⊙ |

TABLE 5

| | COMPARATIVE EXAMPLES | |
|---|---|---|
| | 1 | 2 |
| Outer rubber layer | F | G |
| Polysulfide bonding density (mol/cm$^3$) | $8 \times 10^{-5}$ | $2 \times 10^{-5}$ |
| Material of an inner polyamide resin layer | nylon 11 | nylon 11 |
| Heat treatment conditions: 210° C. × 25 minutes | | |
| Change of rubber hardness (JIS A) | +8 | +12 |
| Delamination strength of an outer layer and an inner layer (N/mm) | rubber break | 0.8 |
| Heat treatment conditions: 210° C. × 20 minutes | | |
| Change of rubber hardness (JIS A) | +3 | +2 |
| Delamination strength of an outer layer and an inner layer (N/mm) | 0.6 | 0.4 |
| Compression set (%): 100° C. × 22 hours | 40 | 41 |
| Hose flexiblity | ◎ | ◎ |
| Impermeability to gasoline | ⊙ | ⊙ |

From the above results, it is found out that the outer layer and the inner layer of every example were strongly bonded in spite of a short heat treatment time, resulting in high quality. Among all, it is apparent that examples 1 to 4, which employed dibenzothiazyl disulfide as a vulcanization accelerator and nylon 11 as polyamide resin, showed superior performance. On the other hand, comparative example 1, which did not contain NBR having a carboxyl group, and comparative example 2, in which crosslinking density by polysulfide bonding is low, showed weak adhesive strength of the outer layer and the inner layer, resulting in lack of practicability.

EXAMPLE 8

16 parts of NBR having a carboxyl group (containing acrylic monomer by 7% by weight) were employed for 100 parts of NBR·PVC. A hose was obtained under the same conditions as those of Example i except for the above.

EXAMPLE 9

The heat treatment condition for the laminate in which polyamide resin powder was laminated was set at 210° C.×10 minutes. A hose was obtained under the same conditions as those of Example 1 except for the above.

The examples 8 and 9 were evaluated in the same ways as those of the above examples and comparative examples. These results are shown in the following table 6.

TABLE 6

|  | EXAMPLES | |
| --- | --- | --- |
|  | 8 | 9 |
| Change of rubber hardness (JIS A) | +4 | +2 |
| Delamination strength of an outer layer and an inner layer (N/mm) | rubber break | 1.6 |
| Compression set (%): 100° C. × 22 hours | 54 | 43 |
| Hose flexibility | ◯ | ◎ |
| Impermeability to gasoline | ◯ | ◎ |

From the above results, it is found out that as the mixing ratio of NBR having a carboxyl group increases, compression set value becomes larger, resulting in a tendency of deterioration of permanent set in fatigue. In addition, when the heat treatment condition is mild too much, there is a tendency that the adhesive property between the outer layer and the inner layer deteriorates.

What is claimed is:

1. A fuel hose comprising an outer rubber layer having a cross-linked structure with a polysulfide bonding density of not less than $4 \times 10^{-5}$ mol/cm$^3$ and being formed by sulfur-vulcanizing a rubber composition comprising a carboxyl group-containing acrylnitrile-butadiene rubber and an inner polyamide resin layer laminated on the inside face of the outer rubber layer and integrated thereinto by heat-bonding so that polysulfide bonds of the outer rubber layer decompose during the heat-bonding and the resultant residue after decomposition combines with polyamide molecules of the polyamide resin layer so as to form a strong bond between the outer rubber layer and the inner polyamide resin layer.

2. A fuel hose according to claim 1, wherein the rubber composition contains a thiazole vulcanization accelerator.

3. A method of producing a fuel hose comprising an outer rubber layer and an inner polyamide layer laminated on and integrated by heat-bonding to the inside face of the outer rubber layer, which comprises:

a) forming the outer rubber layer by sulfur-vulcanizing a rubber composition comprising a carboxyl group-containing acrylonitrile-butadiene rubber to form a cross-linked structure having polysulfide bonding density of not less than $4 \times 10^{-5}$ mol/cm$^3$, b) coating the inside of the outer rubber layer with a polyamide resin powder, and c) heating the polyamide resin powder-coated outer rubber layer to melt the polyamide resin powder and bond the polyamide to the outer rubber layer, wherein a strong bond between the outer rubber layer and the inner polyamide resin layer is formed by decomposing polysulfide bonds of the outer rubber layer and combining the resultant residue after decomposition with polyamide molecules of a molten layer of the polyamide resin powder.

4. A method of producing a fuel hose according to claim 3, wherein the rubber composition contains a thiazole vulcanization accelerator.

* * * * *